UNITED STATES PATENT OFFICE.

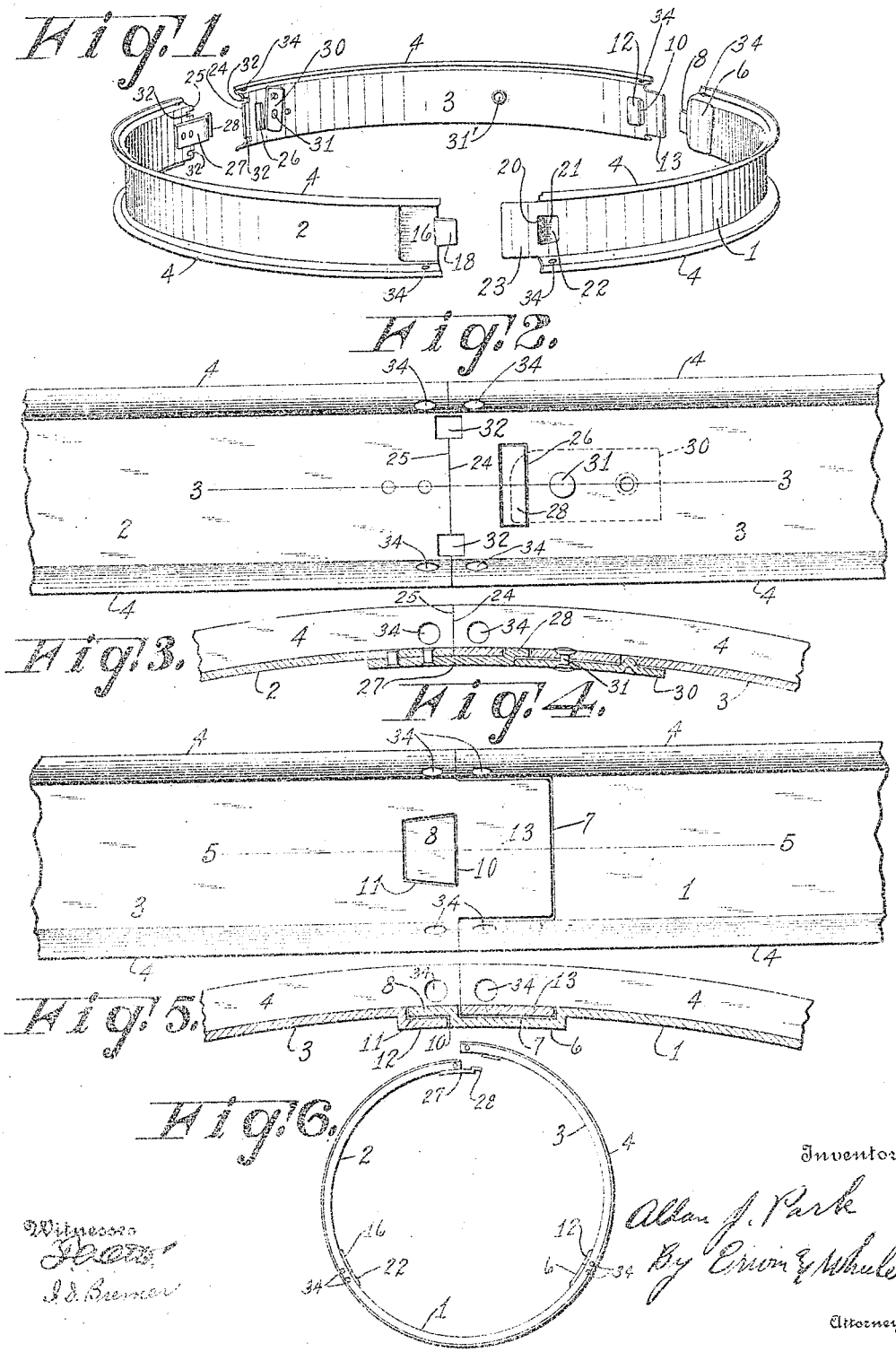

ALLAN J. PARK, OF MADISON, WISCONSIN.

DEMOUNTABLE RIM.

1,220,541.

Specification of Letters Patent.  Patented Mar. 27, 1917.

Application filed March 25, 1916. Serial No. 86,687.

*To all whom it may concern:*

Be it known that I, ALLAN J. PARK, a citizen of the United States, residing at Madison, county of Dane, and State of Wisconsin, have invented new and useful Improvements in Demountable Rims, of which the following is a specification.

My invention relates to the improvement in demountable rims for pneumatic tire casings.

The object of my invention is to provide a rim which can be more easily applied to and removed from a tire casing than those heretofore used. More specifically stated, the object of my invention is to provide a simple and compact means whereby the rim may be formed in separable sections which interlock with each other in such a manner that the meeting ends of two sections may be swung inwardly when the rim is detached from the fixed rim of the vehicle wheel, the inwardly swinging movement being accomplished without depending upon resilience or flexibility in the material composing the rim. The single holding member employed at the point where the inwardly swinging movement commences may be utilized and is sufficient when the said member is in holding position to prevent such movement.

In the drawings—

Figure 1 is a perspective view of a demountable rim embodying my invention, showing the several sections detached.

Fig. 2 is a plan view of a fragment of the rim, showing the joint at which the final mounting or initial demounting movement takes place.

Fig. 3 is a sectional view drawn on line 3—3 of Fig. 2.

Fig. 4 is a plan view showing fragments of the two meeting sections connected with one of the auxiliary interlocking joints.

Fig. 5 is a longitudinal sectional view on line 5—5 of Fig. 4.

Fig. 6 is a side elevation showing one section swung inwardly to a slight extent at the point where the initial movement of separation originates.

Like parts are identified by the same reference characters throughout the several views.

In the construction shown, my improved rim is formed in three sections.

The members 1, 2 and 3 constitute the body of the rim. They are provided with side flanges 4, which may be of any ordinary contour adapted to engage the bead or edge of the tire casing. The rim section 1, is inwardly offset near one end as shown at 6, thereby forming a shallow recess 7 which is best shown in Fig. 5. At the outer end of this recess, the section 1 is provided with a tongue 8, outwardly offset from the base of the recess and projecting longitudinally from the end section in a continuation of the arc of curvature of the body portion 1. The tongue 8 is adapted to be manipulated through a slot 10 formed near one end of the section 3, whereby when the two sections are swung into alinement, the tongue 8 may be engaged in the shallow recess 11 formed by the downwardly offsetting portion 12 of the body of section 3 adjacent to the slot 10. The transverse dimension of the slot 10 and also that of the recess 11 is equal to the width of the tongue 8. Beyond the slot 10 the body 3 is extended in the form of a lip 13 which, when the sections are alined, fills the recess 7.

The end of the section 2 is provided with a downwardly offset portion 16 similar to the offset 6. It also has a tongue 18, similar in form and function to the tongue 8 above described. The tongue 18 is adapted to pass through the slot 20 and enter the recess 21 in the end portion of the section opposite that end which has the tongue 8 and at this opposite end, the section 1 is provided with a recess 22 to receive the lip 23 which is adapted to be received in the recess 16. The interlocking engagement of the sections 1 and 2 is therefore similar to the interlocking engagements 1 and 3, although the interlocking members are reversed.

The opposite ends of the sections 2 and 3 from those above described are straight-edged and adapted for abutting contact with each other at the edge margins 24, 25. The section 3 is provided with a transverse slot 26 near the margin 25, and the section 2 is provided with a projecting tongue 27 having an interlocking offset 28 adapted to enter slot 26 when these two sections, 2 and 3, are brought into abutting contact at the edges 24 and 25. The tongue 27 is preferably riveted to the inner surface of section 2 near the edge margin 25 thereof and the interlocking portion 28 of the tongue is outwardly offset to a position in the arc of curvature of section 2. When this portion 28 is in interlocking position in slot 26, it may be secured in such position by an ordinary turn button 30, pivoted to the section 3 at 31, and adapted to be swung to the position indicated by the dotted lines in Fig. 2, whereupon it overlaps the inner face of the interlocking member 28 and prevents the latter from disengaging from slot 26.

31 is an aperture to receive the tire nipple. 32 designates slots formed in the meeting extremities of the sections 2 and 3 near the side flanges to facilitate expanding the rim within the tire casing. Apertures 34 are formed in the flanges 4 to receive the side clips whereby the demountable rim is secured in position on the fixed rim of the wheel.

To insert my improved demountable rim within a tire, the sections 2 and 3 may be interlocked with section 1 by manipulating tongues 8 and 18 through the slots 10 and 20 and then swinging the sections into an approximate common arc of curvature. By moving the free ends of the sections 2 and 3 inwardly the rim may then be readily inserted within the tire casing, after which it may be expanded in the ordinary manner by means of a tool engaging in holes 34 or in the notches 32. When sufficiently expanded within the tire casing, the interlocking tongue portion 28 will register with the slots 26. Section 2, which has theretofore been swung inwardly to allow this interlocking portion 28 to lap upon the inner face of section 23, may now be pushed outwardly until the member 28 enters the slot 26, whereupon button 30 may be swung to the position indicated by dotted lines in Fig. 2, thereby completing the operation. To release the rim from the tire casing it is merely necessary to reverse the manipulation above described. Button 30 will first be swung to releasing position, whereupon section 2 may be pushed or driven inwardly until member 28 disengages from slot 26, whereupon sections 2 and 3 may readily be collapsed inwardly and disengaged from section 1.

I claim—

1. A demountable rim comprising a plurality of interlocking sections two of which are adapted to be manipulated into interlocking engagement with a third section; said first mentioned two sections having abutting marginal portions, one of which is provided with an inwardly offset tongue having an outwardly offset extremity adapted for interlocking engagement in said slot, and adjustable means adapted to retain said outwardly offset portion of the tongue in engagement with said slot when in interlocking position therein.

2. A demountable rim comprising the combination of a plurality of sections two of which have meeting end portions adapted to move radially into interlocking engagement, and a third section having its ends adapted to respectively engage the other ends of the first mentioned two sections, the meeting ends of the third section and the other two sections being provided with interlocking counterpart members adapted to be manipulated into mutual engagement by a swinging motion of one section upon the other.

3. A demountable rim comprising a combination of a plurality of sections two of which have meeting end portions adapted to move radially into interlocking engagement, and a third section having its ends adapted to respectively engage the other ends of the first mentioned two sections, the meeting ends of the third section and the other two sections being provided with interlocking counterpart members adapted to be manipulated into mutual engagement by a swinging motion of one section upon the other, one of the meeting end portions of said sections being provided with a slot through which the tongue on one of the other sections may be manipulated, and also having a recess adjacent to said slot adapted to receive the tongue, substantially as described.

In testimony whereof I affix my signature in the presence of two witnesses.

ALLAN J. PARK.

Witnesses:
 FRED. M. BROWN,
 HENRY L. TUMILL.